(12) United States Patent
Baur

(10) Patent No.: US 7,859,157 B2
(45) Date of Patent: Dec. 28, 2010

(54) MAGNETIC LEVITATION SYSTEM

(75) Inventor: Heinrich Baur, Zurich (CH)

(73) Assignee: ETH Zurich, Zurich (CH)

( * ) Notice: Subject to any disclaimer, the term of this patent is extended or adjusted under 35 U.S.C. 154(b) by 274 days.

(21) Appl. No.: 12/083,670

(22) PCT Filed: Dec. 1, 2006

(86) PCT No.: PCT/EP2006/011570

§ 371 (c)(1),
(2), (4) Date: Apr. 16, 2008

(87) PCT Pub. No.: WO2007/065608

PCT Pub. Date: Jun. 14, 2007

(65) Prior Publication Data

US 2009/0160279 A1    Jun. 25, 2009

Related U.S. Application Data

(60) Provisional application No. 60/748,475, filed on Dec. 8, 2005.

(51) Int. Cl.
*H02K 41/00* (2006.01)
*H02N 15/00* (2006.01)
(52) U.S. Cl. .................... 310/90.5; 361/144
(58) Field of Classification Search ............. 310/68 B, 310/90.5; 361/144
See application file for complete search history.

(56) References Cited

U.S. PATENT DOCUMENTS 3,493,275 A    2/1970    Stone et al.
3,589,300 A    6/1971    Wipf
4,500,142 A *  2/1985    Brunet ................. 310/90.5

(Continued)

FOREIGN PATENT DOCUMENTS

WO    WO 2004/020942 A1    3/2004
WO    WO 2004/030198 A2    4/2004

OTHER PUBLICATIONS

Braunbek; "Freischwebende Körper im elektrischen und magnetischen Feld"; Apr. 17, 1939; pp. 753-763.

(Continued)

*Primary Examiner*—Quyen Leung
*Assistant Examiner*—David W. Scheuerman
(74) *Attorney, Agent, or Firm*—Laurence A. Greenberg; Werner H. Stemer; Ralph E. Locher

(57) ABSTRACT

A magnetic levitation system for supporting an object against gravity by a supporting force includes a permanent-magnet dipole aligned in a vertical position and coupled to the object, a supporting-field generator and a stabilization system. The supporting-field generator generates a supporting force on the permanent-magnet dipole via a supporting field. The supporting field is a two-dimensional or three-dimensional magnetic quadrupole field so that the supporting force is independent of a position of the dipole. The stabilization system constrains the dipole against movements in at least one horizontal direction, and includes a diamagnetic element coupled to the dipole and arranged below the dipole, and a stabilizing-field generator generating a second two-dimensional or three-dimensional stabilizing field to restore said diamagnetic element to a position where the field strength of the stabilizing field has a local minimum.

10 Claims, 14 Drawing Sheets

U.S. PATENT DOCUMENTS

| | | | |
|---|---|---|---|
| 5,485,748 | A | 1/1996 | Zeamer |
| 5,847,480 | A | 12/1998 | Post |
| 6,483,222 | B2 | 11/2002 | Pelrine et al. |
| 6,799,462 | B1 | 10/2004 | Berstis |
| 2003/0151321 | A1 | 8/2003 | Gery |
| 2009/0160279 | A1* | 6/2009 | Baur .................. 310/90.5 |

OTHER PUBLICATIONS

Braunbek; "Freies Schweben diamagnetischer Körper im Magnetfeld"; Apr. 17, 1939; pp. 764-769.

Simon; Diamagnetically stabilized magnet levitation; Apr. 5, 2001; pp. 702-713.

* cited by examiner

MAGNETIC LEVITATION SYSTEM

BACKGROUND OF THE INVENTION

This invention relates to a magnetic levitation system.

For many applications a rigid body needs to be suspended while frictionless motion in at least one degree of freedom must be allowed without are storing force. The gravitational force acting on the body must be exactly compensated independent of the body's position. Examples: seismometer, inclinometer.

Many scientific instruments measure a force experienced by a mass. Examples: accelerometer, balance. One method to measure such a force is to convert the force as precisely as possible to an electrical signal like a voltage or a current that can be measured with digital meters.

Sometimes, a levitating body not only needs to be isolated from external forces but also must be housed in a closed vessel. This is for example the case, when the reaction of an aggressive gas with a sample material is studied using a balance to measure the mass of the reaction products. In such a case no sensitive mechanical or electronic parts can be placed inside the reaction vessel.

Mechanical suspension systems, utilizing pin or edge bearings, torsion wires, leaf springs, or the like, cause internal friction and forces being a function of position. Active magnetic bearings are bound up with strongly position dependent forces and need electric power, a disadvantage for mobile instruments. Passive magnetic bearings by means of superconductors are ideal in terms of low friction and are used successfully, e.g. for gravimeters. But the expense for cooling the superconductors is considerable.

A force to be measured can be converted to the extension or contraction of a spring. This method is based on the assumption of the spring constant being really constant. A piezoelectric sensor or any field of force with a constant gradient can be regarded as a <<spring>> in a wider sense. Such fields of force can for example be related to electric or magnetic fields acting on electric charges, magnetic dipoles, or a current carried by a conductor. A good alternative to the <<spring>> is given by a closed-loop servo system consisting of a position sensor, an amplifier, and an actuator holding the movable part in place by exactly compensating the force to be measured. The force output of the actuator corresponds to an electrical variable representing the force to be measured. Examples: the currents carried by either the rotating coil of a galvanometer or the moving coil of a voice-coil drive. The currents must be supplied to these coils by flexible leads or sliding contacts causing interfering forces and friction.

A sample in a closed vessel can be weighed with a so-called magnetic-suspension balance. A magnetic-suspension balance is simply a conventional balance carrying an electromagnet outside of the vessel. The electromagnet, controlled by a position transducer, is carrying the sample inside the vessel. The electromagnet acts as a tare weight and needs current leads responsible for additional forces disturbing the balance.

SUMMARY OF THE INVENTION

The present invention therefore addresses the problem to avoid the above-mentioned drawbacks of the known solutions. The task of the invention is to provide a magnetic levitation system—abbreviated by <<MAGLEV>>—for an object, which MAGLEV can easily solve the above mentioned technical problems.

The invention presented here is a particular type of passive magnetic levitation system characterized by a specific property of the force supporting the levitating object, i.e. the supporting force is independent of the levitating object's position, which property is equivalent to a zero <<spring constant>>. To solve the above mentioned technical problems the passive magnetic levitation system is supplemented with an active component. According to Earnshaw's theorem stable passive magnetic levitation cannot be achieved by permanent magnets alone. W. Braunbek, "Freischwebende Körper im Elektrischen und Magnetischen Feld," Z. Phys., Vol. 112, 1939, pages 753-769, considered the problem of passive magnetic levitation at full length and proved in theory and by experiments that passive magnetic levitation is possible with the use of diamagnetic materials. Diamagnetic materials, characterized by their negative magnetic susceptibility, are repelled by permanent magnets. The effect of repulsion is very weak except for superconducting materials. Superconductors have a magnetic susceptibility of $-1$ in contrast to $-1.7 \times 10^{-4}$ for bismuth at room temperature. While the use of superconductors for magnetic levitation is already a common practice, applications of diamagnetic materials at room temperature are still scarce. Simon, M. D., Heflinger, L. O., and Geim, A. K., "Diamagnetically Stabilized Magnet Levitation," Am. J. Phys., Vol. 69 (6), 2001, pages 702-713, have presented examples of how the bulk of gravity can be compensated by permanent magnets while diamagnetic repulsion is necessary for stabilization only.

The principle of pure, balloon like—i.e. position independent—compensation of gravity by a magnetic force and stabilization with a diamagnetic material is optimized with the invention presented here. The method starts with the design of a magnetic field for strict compensation of gravity. We are looking for a homogeneous field of force supporting a magnetic body independent of its position. In a Cartesian coordinate system with the vertical coordinate z and horizontal coordinates x and y the vertical force component $F_z(x, y, z)$, i.e. the supporting force, must thus be constant. Let's consider the simple case of the supported body being a small magnetic dipole with vertically aligned axis and magnetic moment $\mu$. If the vertical component of a magnetic field is $B_z(x, y, z)$ the dipole experiences a force with the vertical component $$F_z = \mu \cdot \frac{\partial B_z}{\partial z}.$$

Integrating this equation we find $B_z(x, y, z) = B_{0z} + C \cdot z$ with constants $B_{0z}$ and $$C \equiv \frac{F_z}{\mu}.$$

In a vortex-free region of space the magnetic field must be a solution of Laplace's equation:

$$\frac{\partial B_x}{\partial x} + \frac{\partial B_y}{\partial y} + \frac{\partial B_z}{\partial z} = 0.$$

Replacing $$\frac{\partial B_z}{\partial z}$$

using the first derivative of the above equation for $B_z$ we get an equation for the horizontal components of the magnetic field vector:

$$\frac{\partial B_x}{\partial x} + \frac{\partial B_y}{\partial y} = -C.$$

Two simple solutions of this equation are known as quadrupole fields. The first being the two-dimensional quadrupole field:

$$B_x = 0, B_y = -C \cdot y, B_z = C \cdot z$$

The second being the three-dimensional quadrupole field:

$$B_x = -\frac{1}{2} \cdot C \cdot x, B_y = -\frac{1}{2} \cdot C \cdot y, B_z = C \cdot z$$

Both kinds of quadrupole fields can be utilized to support a magnetic dipole. The two-dimensional quadrupole field is suitable for applications needing free motions either parallel to the horizontal x-axis or in a vertical plane parallel to x/z. In addition free rotation around a vertical axis parallel to z is possible. In contrast the three-dimensional quadrupole field only permits free translational movements parallel to the vertical z-axis and/or free rotation around an axis parallel to z.

BRIEF DESCRIPTION OF THE SEVERAL VIEWS OF THE DRAWINGS

The working principle of the invention will now be described in further details with reference to the accompanying drawings, wherein.

DETAILED DESCRIPTION OF THE INVENTION

Figure 1A:
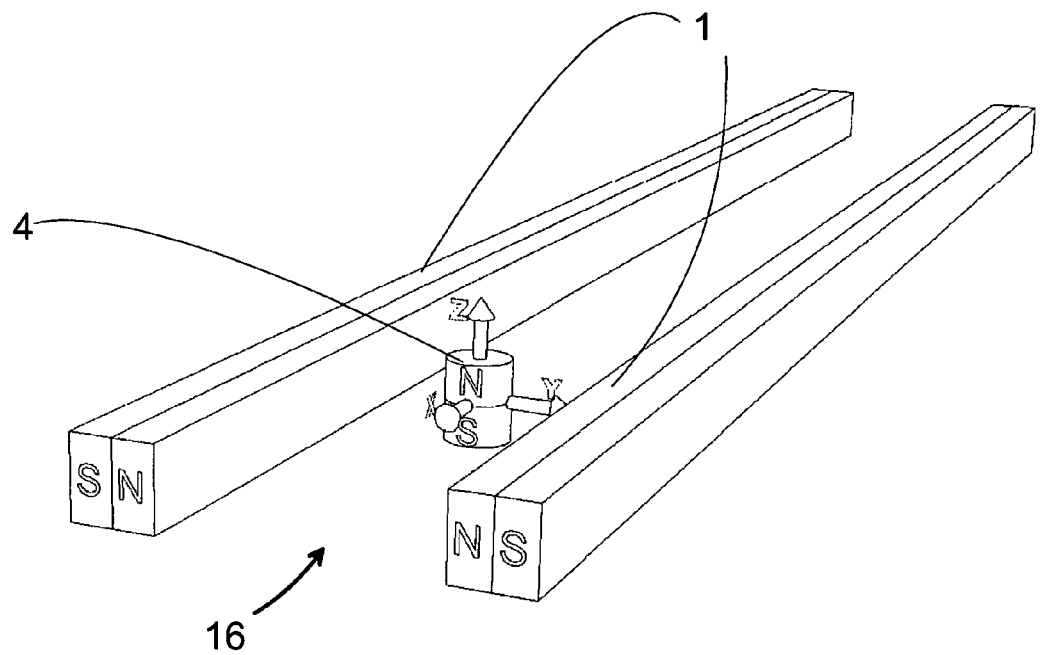
FIG. 1a shows a two-dimensional quadrupole field approximated by two permanent-magnet bars 1 with facing equal poles, where a small dipole magnet 4 is supported.

FIGS. 1a, 1b, 1c, 2a, 2b, 2c, 3a, and 3b are showing different embodiments of a supporting-field generator 16 with permanent magnets 1, 2, 6, 13 or with anti-Helmholtz coils 3, 14. In each embodiment a dipole magnet 4 is supported by a magnetic quadrupole field, called supporting field.

FIGS. 5a, 5b, 5c, 6a, 6b, 7a, 7b, 7c, 7d and 7e are showing different embodiments of a stabilizing field generator 15 comprising permanent magnets 1, 2, 13. The stabilizing field generator 15 generates a magnetic field, called stabilizing field, acting on a diamagnetic element 8.

Figure 1B:
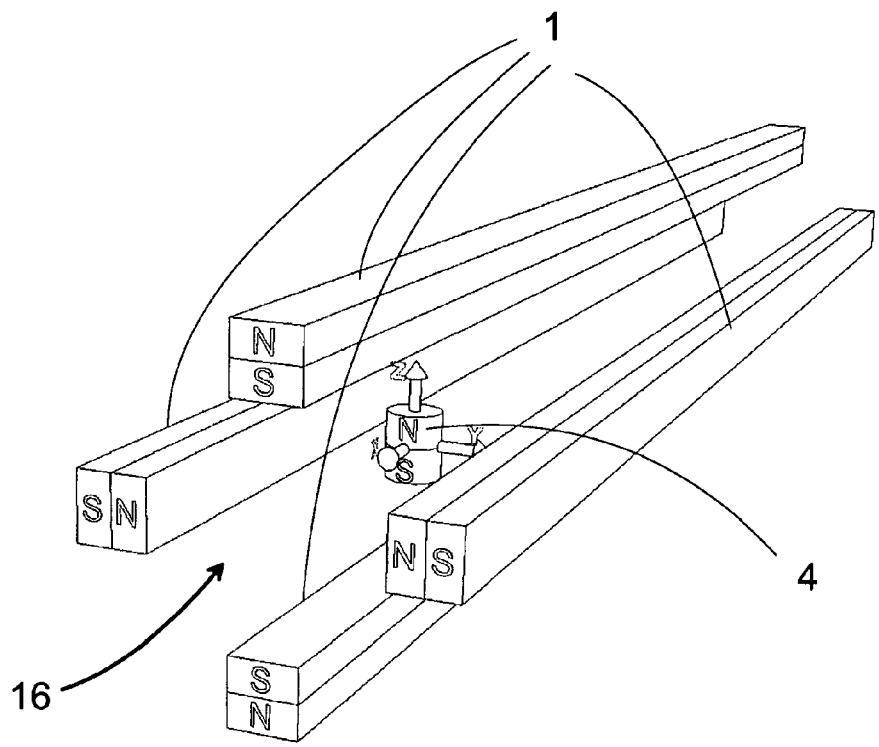
FIG. 1b shows a two-dimensional quadrupole field approximated by four permanent-magnet bars 1 with facing equal poles, where a small dipole magnet 4 is supported.
Figure 1C:
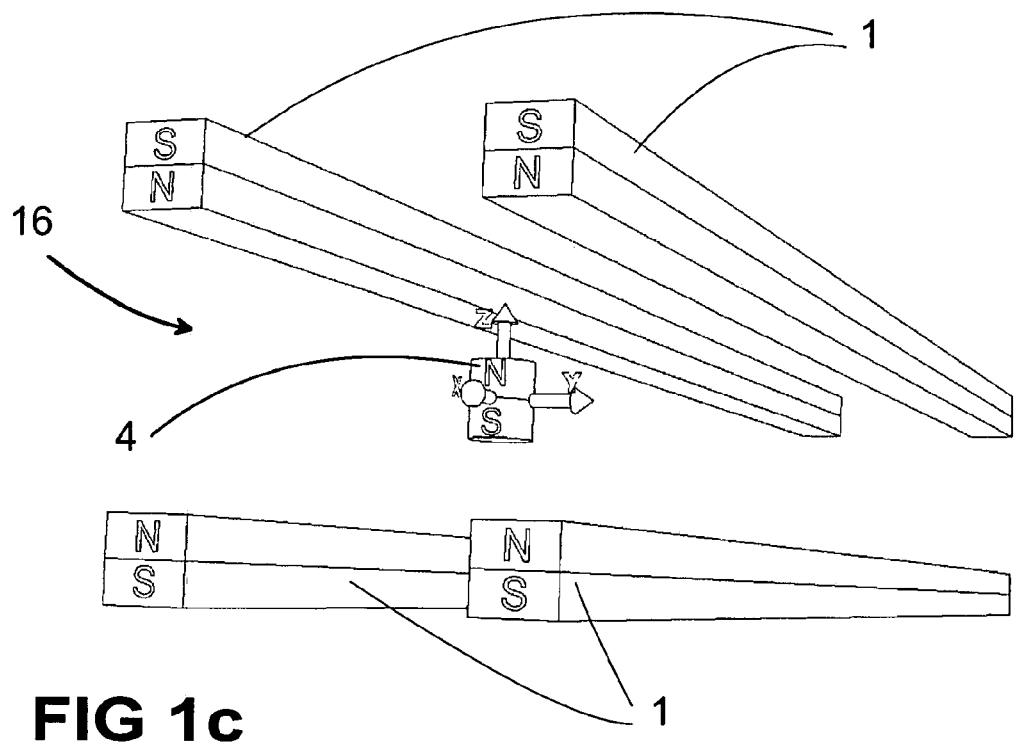
FIG. 1c shows a two-dimensional quadrupole field approximated by four permanent-magnet bars 1, two by two in horizontal planes, where a small dipole magnet 4 is supported.
Figure 2A:
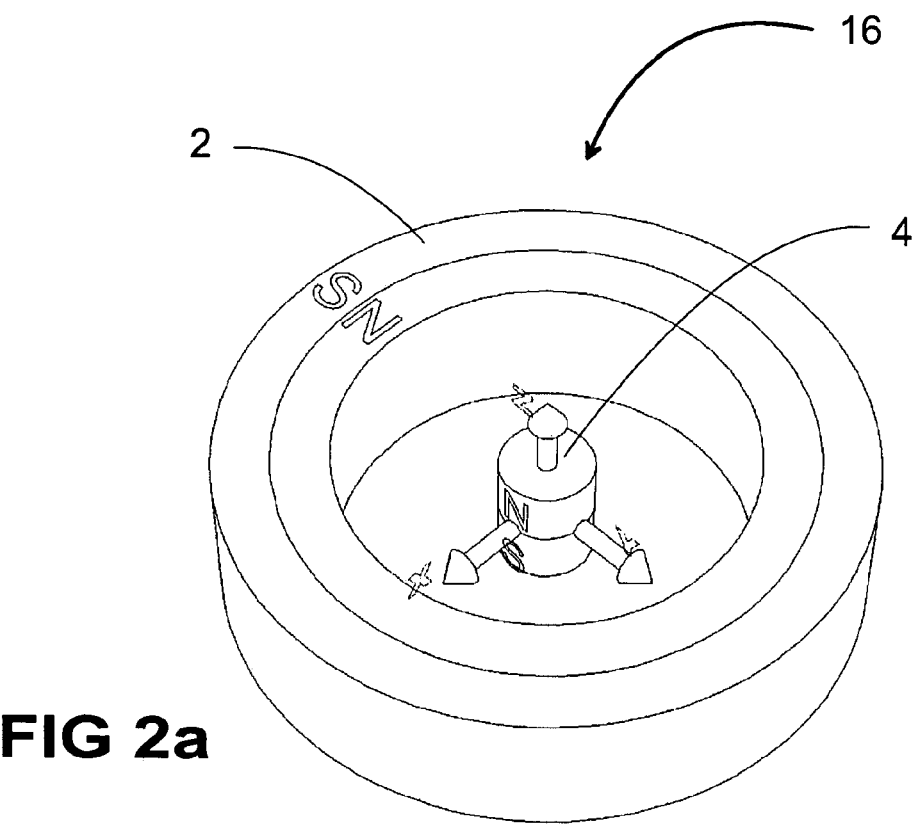
FIG. 2a shows a three-dimensional quadrupole field approximated by a radially magnetized permanent-magnet ring 2, wherein a small dipole magnet 4 is supported.
Figure 2B:
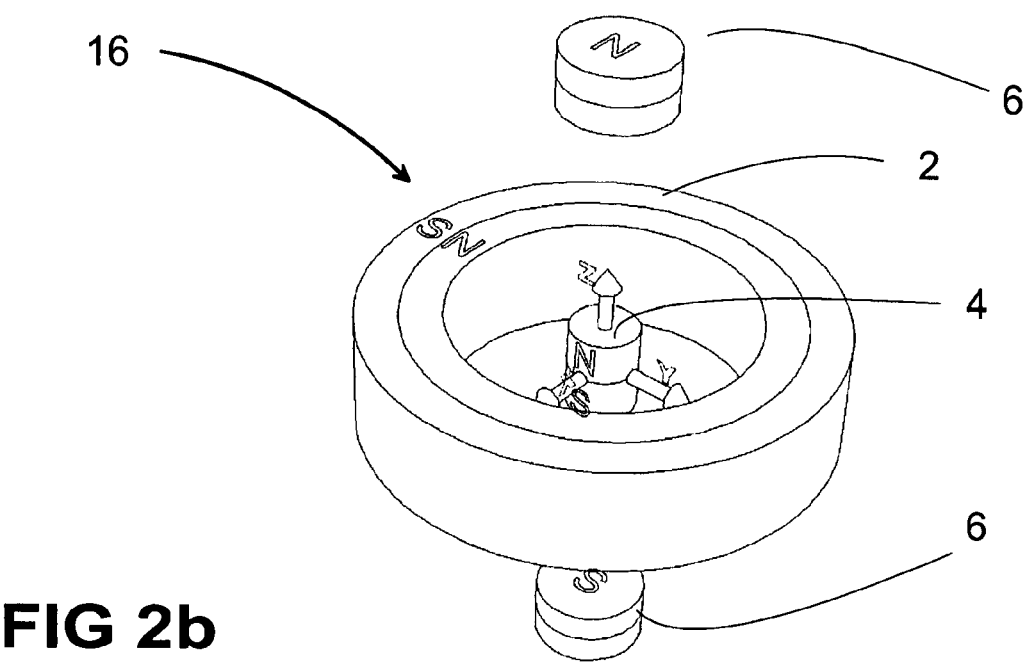
FIG. 2b shows a three-dimensional quadrupole field approximated by a radially magnetized permanent-magnet ring 2 and two dipole magnets 6 above and below, where a small dipole magnet 4 is supported.
Figure 2C:
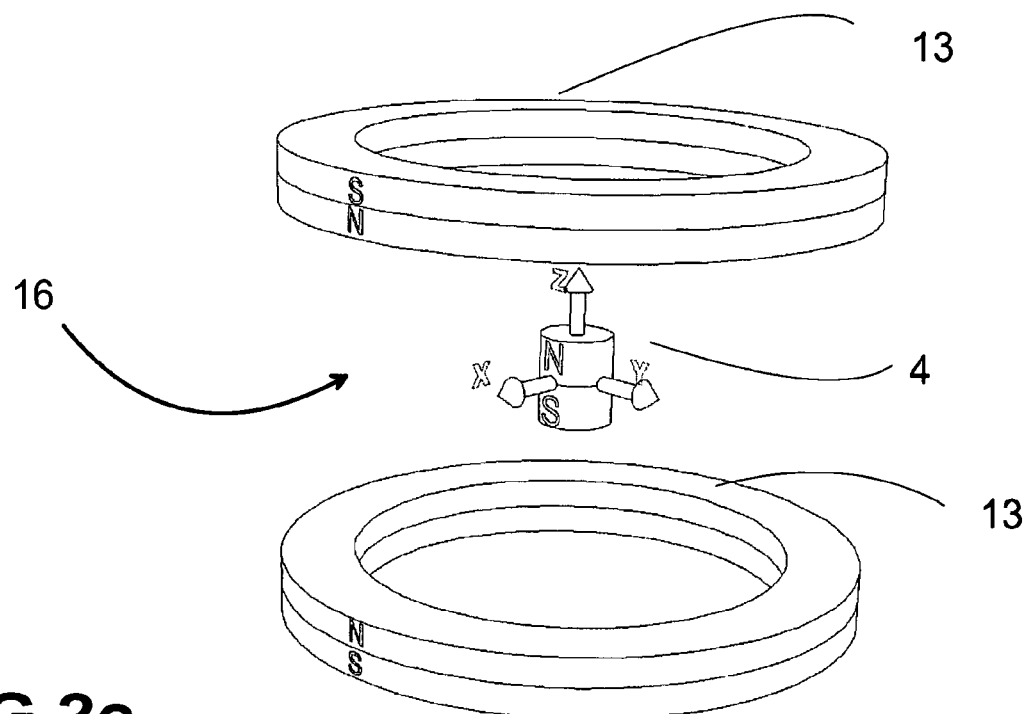
FIG. 2c shows a three-dimensional quadrupole field approximated by two axially magnetized permanent-magnet rings 13 with opposing equal poles, where a small dipole magnet 4 is supported.

The following addresses how a quadrupole field can be approximated with permanent magnets. The simplest way to accomplish a two-dimensional quadrupole field is by utilizing two long bars 1 of rectangular cross section magnetized perpendicularly to their longitudinal axes. The two bars 1 are mounted with axes parallel and equal poles face to face, see FIG. 1a. FIGS. 1b and 1c are showing alternative configurations comprising four bars 1 each. The designs of FIGS. 1a and 1c in contrast to 1b are leaving space to attach a payload 5 (not shown in FIGS. 1a and 1c) either above or below the levitating dipole magnet 4. A three-dimensional quadrupole field can, by analogy with FIG. 1a, be accomplished with a radially magnetized ring 2, see FIG. 2a. FIGS. 2b and 2c are displaying options corresponding to 1b and 1c respectively. The two rings 13 in FIG. 2c are magnetized axially unlike the rings in 2a and 2b. With the exception of the single ring 2 in FIG. 2a all configurations shown allow for tuning the quadrupole constant C for a given payload 5 (not shown in FIGS. 1a and 1c) by shifting individual magnet components 1, 2, 6, 13. All configurations presented in FIGS. 1a up to 2c will work equally well if all the poles marked <<N>> (north) are swapped for poles marked <<S>> (south) and vice versa.

The following addresses how a quadrupole field can be approximated with coils carrying electric currents. A well known configuration generating a good approximation of a three-dimensional quadrupole field is named anti-Helmholtz coils 3. Anti-Helmholtz coils 3, depicted in FIG. 3b, look like a set of Helmholtz coils used to generate a nearly homogeneous magnetic field. In contrast to Helmholtz coils, carrying parallel currents, the coils of a pair of anti-Helmholtz coils 3 carry currents of opposite directions 7. Rectangular coils 14 analogue to anti-Helmholtz coils generating an approximate two-dimensional quadrupole field are displayed in FIG. 3a.

Figure 4:
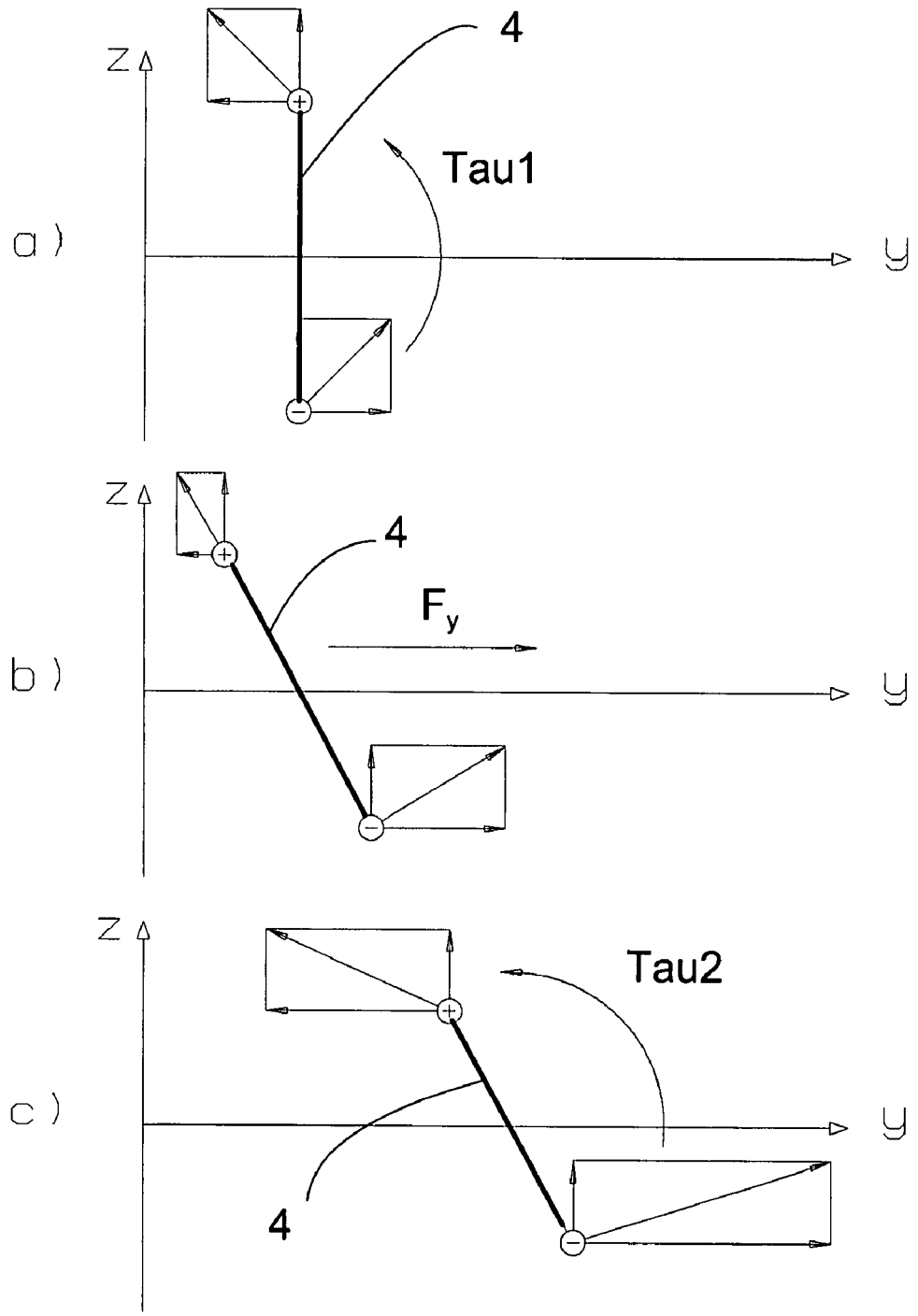
FIG. 4 shows an instability of a dipole 4 supported in a quadrupole field, where
 a) a torque Tau1 is resulting from opposite forces acting on individual charges,
 b) a resulting force $F_y$ parallel to the y-axis is caused by non-balanced forces,
 c) torque Tau2 and resulting force are enhanced with increasing distance from the coordinate origin.
Figure 5A:
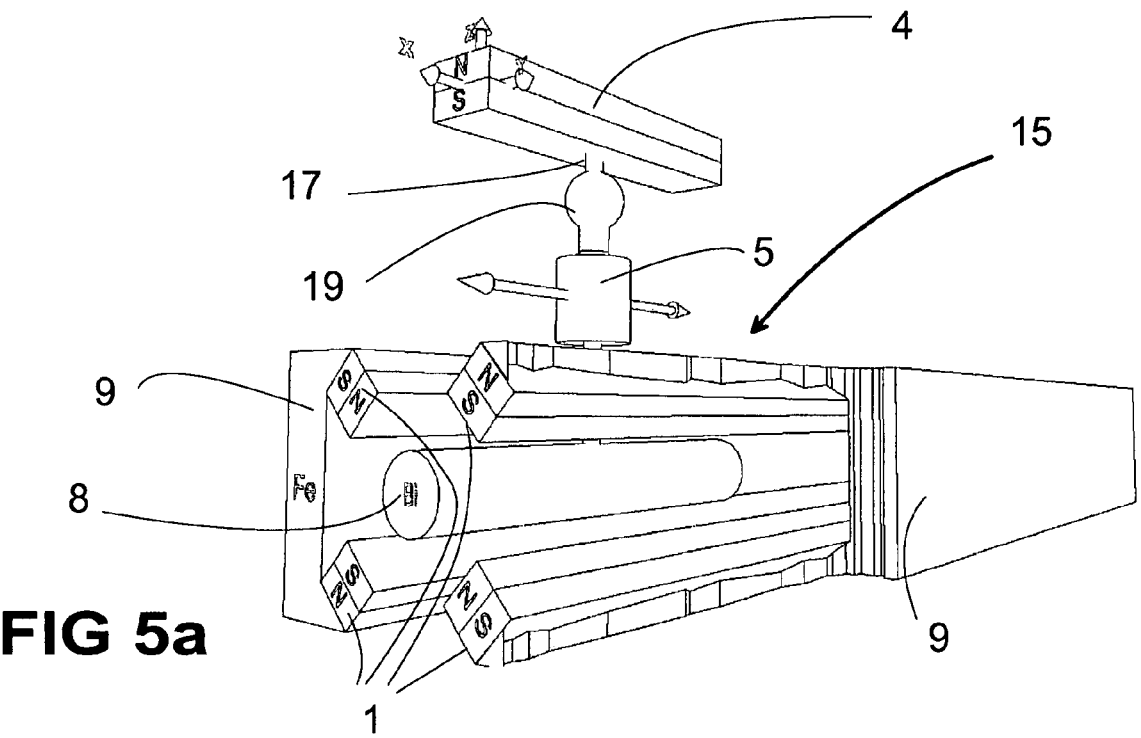
FIG. 5a shows a stabilization of a dipole 4 supported in a two-dimensional quadrupole field where a diamagnetic rod 8 is guided along the axis of a two-dimensional quadrupole field, pairs of permanent-magnet bars 1 are connected by iron yokes 9, this configuration allows free translational movements parallel to the x-axis.
Figure 5B:
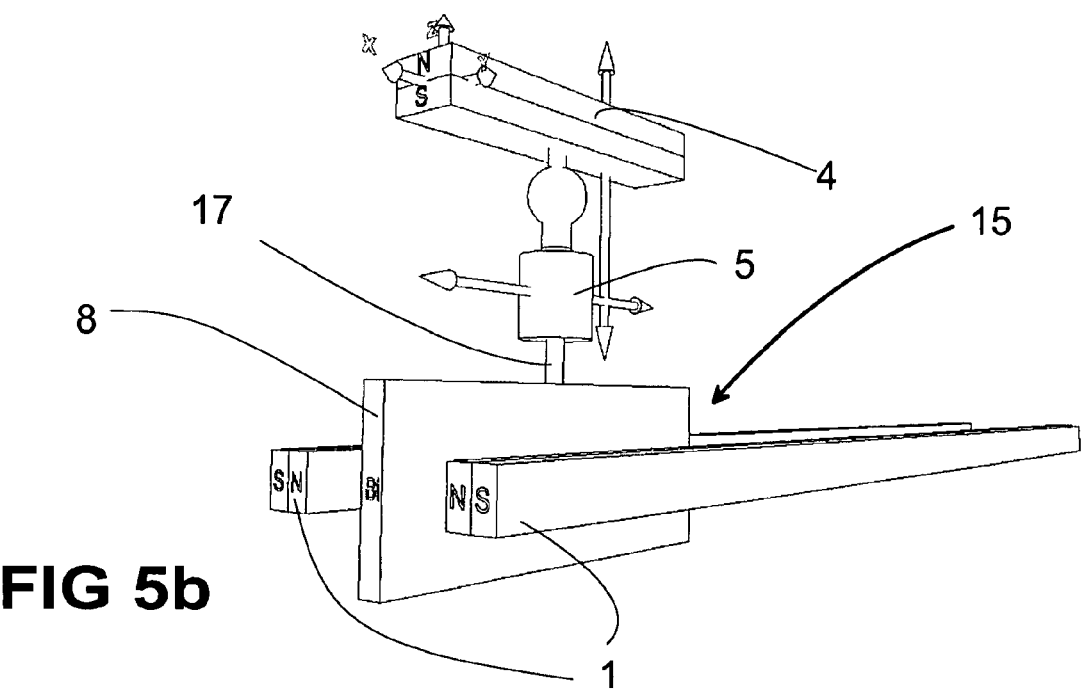
FIG. 5b shows a stabilization of a dipole 4 supported in a two-dimensional quadrupole field, where a diamagnetic plate 8 guided in a two-dimensional quadrupole is permitting two degrees of freedom indicated by arrows.
Figure 5C:
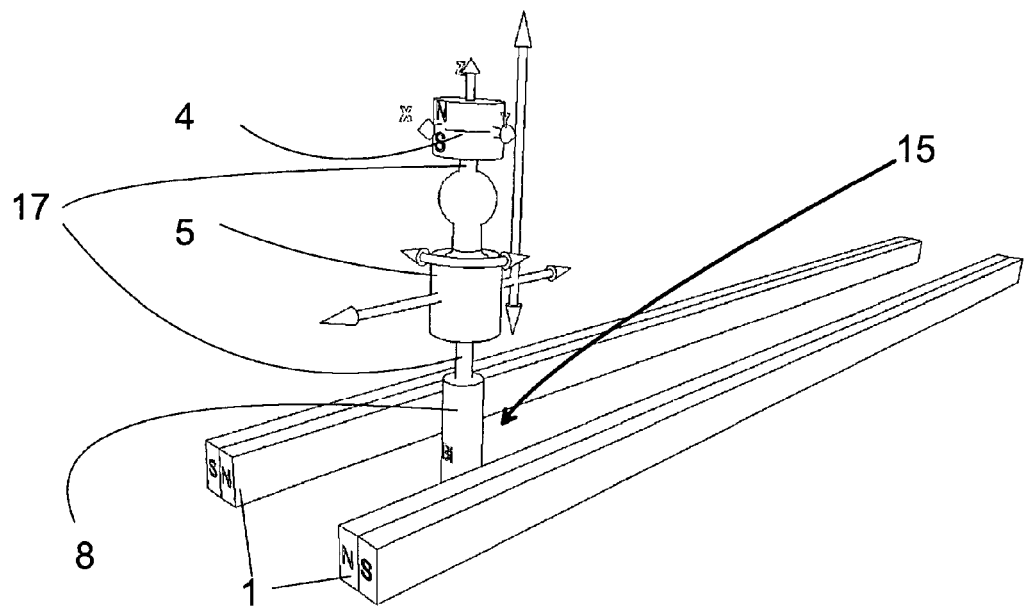
FIG. 5c shows a stabilization of a dipole 4 supported in a two-dimensional quadrupole field, where a diamagnetic vertical rod 8 guided in a two-dimensional quadrupole field is allowing three degrees of freedom indicated by arrows.
Figure 6A:
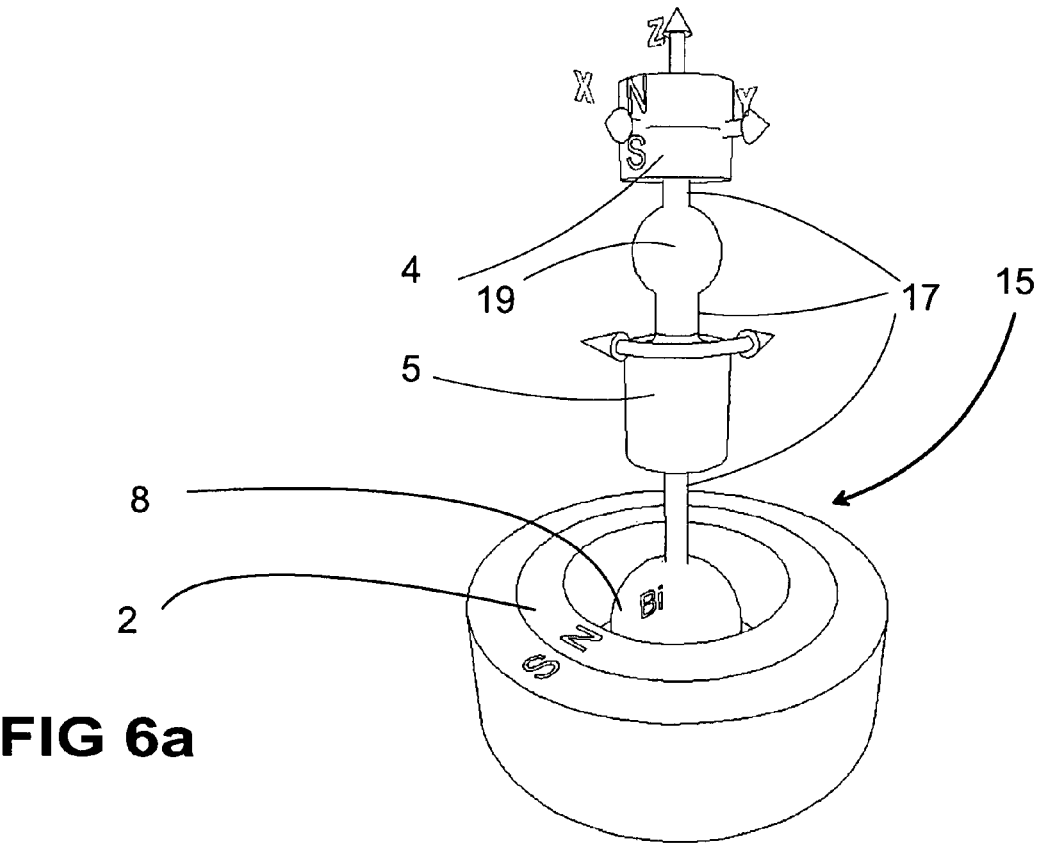
FIG. 6a shows a stabilization of a dipole 4 supported in a three-dimensional quadrupole field by means of a diamagnetic sphere 8 immersed in an additional three-dimensional quadrupole field with rotation around the vertical z-axis indicated by an arrow, rotation is the only degree of freedom in this case.

The following addresses why a dipole supported by a quadrupole field needs to be stabilized with a diamagnetic material and how stabilization is achieved. A dipole magnet 4 aligned perfectly with the vertical z-axis of a quadrupole field is supported in an indifferent fashion similar to a balloon supported by buoyancy of air. But if the dipole is allowed to rotate around a horizontal axis then a horizontal instability will arise. To explain this instability the dipole is shown symbolically in FIG. 4 as an electrostatic dipole 4 consisting of two connected equal charges of opposite sign. If the y-coordinate of the dipole 4 is nonzero the dipole will experience a torque resulting from opposite forces acting on the individual charges, see FIG. 4 part a). The torque τ is given by (in the figures τ is denoted by respectively by <<Tau1>> and <<Tau2>>

$$\tau = C \cdot \mu \cdot y = F_z \cdot y \text{ and}$$

$$\tau = \frac{1}{2} \cdot C \cdot \mu \cdot y = \frac{1}{2} \cdot F_z \cdot y$$

for two-dimensional and three-dimensional quadrupole fields respectively. The torque τ rotates the dipole around the horizontal x-axis, perpendicular to the page. As a consequence, the opposite forces acting on the charges are no longer balanced which results in a force $F_y$ parallel to the y-axis, see FIG. 4 part b). This force drives the dipole further off the coordinate origin hereby enhancing the torque, cf. FIG. 4 part c). The instability can be moderated but not avoided by means of a counteracting torque being a linear function of the angular deviation from the vertical. A counteracting torque can be achieved by superposing a vertically aligned homogeneous field on the quadrupole field. A homogeneous field does not exert a force on the dipole 4 but tends to align it, like a compass. As a simpler alternative the levitating body can be designed as a pendulum by attaching the payload 5 with a rigid connection 17 below the dipole magnet 4. A counteracting torque alone however, is insufficient to stabilize the dipole. A restoring force proportional to the horizontal displacement y is necessary to stabilize the levitating dipole 4. Here, we propose to realize the restoring force by means of diamagnetic material 8. Stabilization is most efficient if the bottommost part of the levitating body is made of diamagnetic material immersed in stabilizing field, preferably a quadrupole field. In a two-dimensional quadrupole field the absolute value of the magnetic field is increasing in proportion to the distance from the axis of symmetry. Diamagnetic material 8 is therefore restored to the axis of symmetry. In a three-dimensional quadrupole field the absolute value of the restoring force is proportional to the distance from the center. Immersed diamagnetic material 8 is restored from all directions towards the centre. FIGS. 5a, 5b and 5c are showing several options for the stabilization of a dipole supported in a two-dimensional quadrupole field. FIG. 5a represents a diamagnetic rod 8 guided along the axis of a two-dimensional quadrupole field. This configuration acts like a railway track allowing free translational movements parallel to the x-axis. Even curved <<tracks>> can be designed. A diamagnetic plate 8 guided in a two-dimensional quadrupole, as depicted in FIG. 5b, permits additional free vertical movements. Diamagnetic material in the shape of a vertical cylinder tolerates an auxiliary rotation around a vertical axis, cf. FIG. 5c. If rotation around a vertical axis is disallowed by a given kind of diamagnetic stabilization then a dipole magnet 4 supported by a two-dimensional quadrupole field can be extended to become a two-dimensional dipole magnet or permanent-magnet bar as shown in FIGS. 5a and 5b. Two configurations to stabilize a dipole 4 supported in a three-dimensional quadrupole field are presented in FIGS. 6a and 6b respectively. Stabilization by means of a diamagnetic sphere 8 in a three-dimensional quadrupole field is illustrated in FIG. 6a. In this case the only degree of freedom left is rotation around the vertical z-axis. A handle 19 belonging to the sample 5 is depicted in FIGS. 5a to 6b; however this handle 19 has no technical contribution to the levitation system according to the present invention.

Figure 6B:
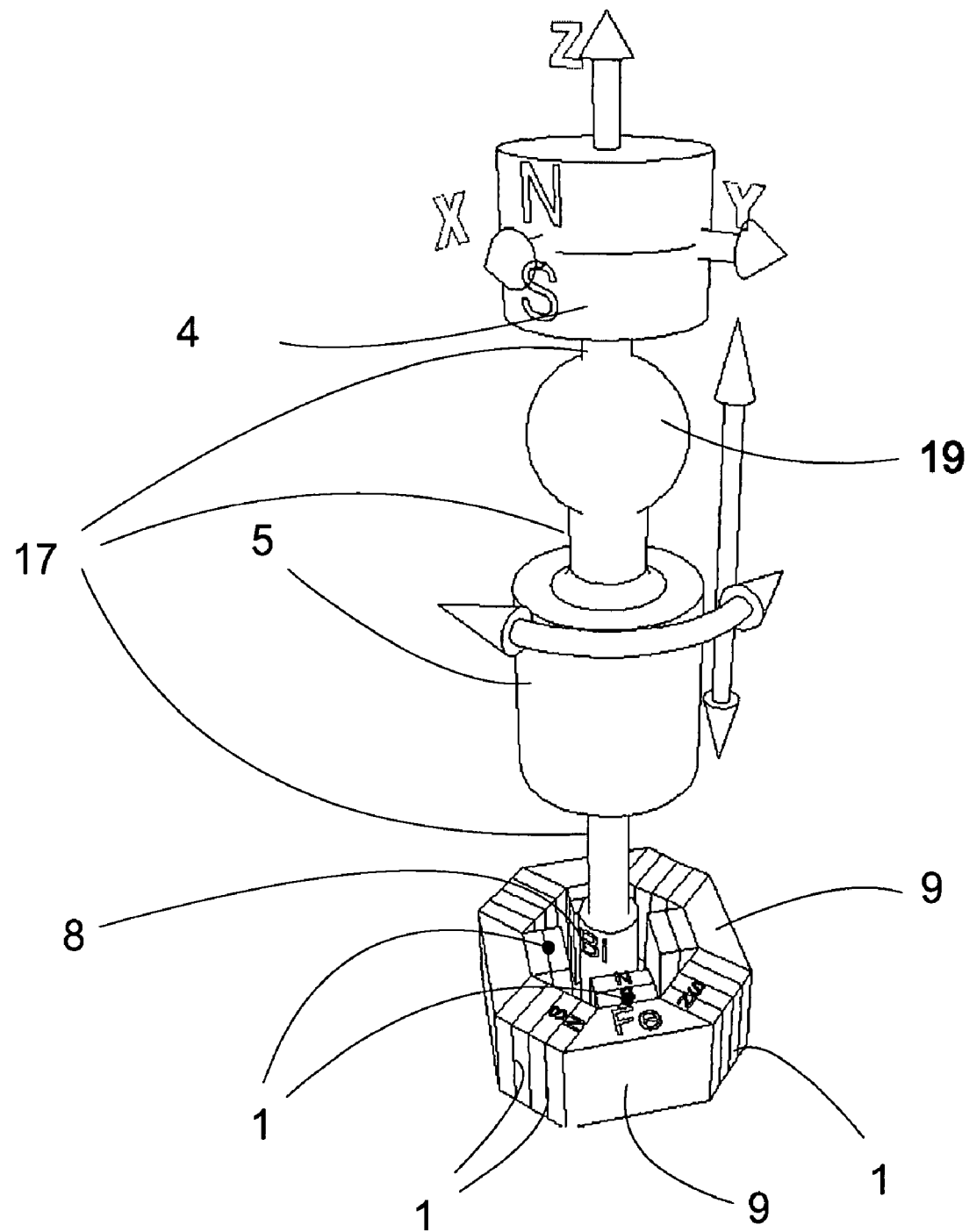
FIG. 6b shows a stabilization of a dipole 4 supported in a three-dimensional quadrupole field where a diamagnetic rod 8 is immersed in a two-dimensional quadrupole field, this configuration allows free translational movements parallel to the vertical z-axis and rotation around the vertical z-axis, as indicated by arrows.

A system with a diamagnetic cylinder 8 centered in a two-dimensional quadrupole field is demonstrated in FIG. 6b. This kind of stabilization allows free translational motion along as well as rotation around the z-axis.

Figure 7A:
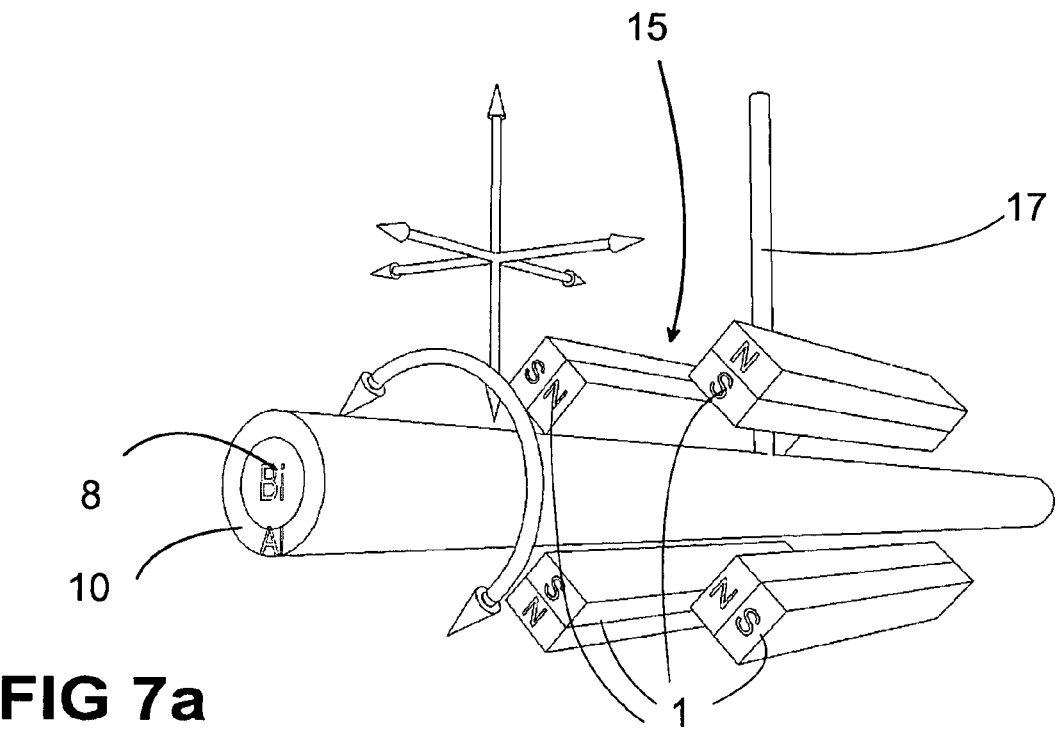
FIG. 7a shows a damping by means of eddy currents where a horizontal diamagnetic rod 8 is guided in a two-dimensional quadrupole field, the rod 8 is much longer than the permanent-magnet bars 1, all motions indicated by arrows are damped, the diamagnetic material is coated by a substance with better conductivity 10 to enhance the damping effect.
Figure 7B:
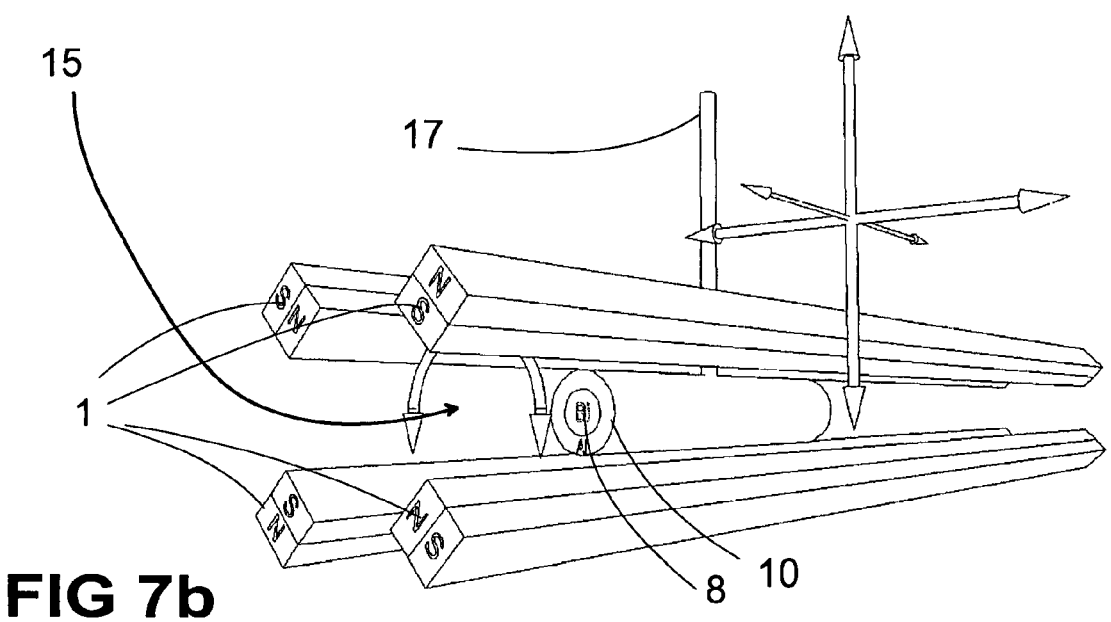
FIG. 7b shows a damping by means of eddy currents where a horizontal diamagnetic rod 8 is guided in a two-dimensional quadrupole field, the rod 8 is much shorter than the permanent-magnet bars 1, three motions indicated by thick arrows are damped. The horizontal motion parallel to the permanent-magnet bars 1 is not damped, indicated by a thin arrow, the diamagnetic material 8 is coated by a substance with better conductivity 10 to enhance the damping effect.
Figure 7C:
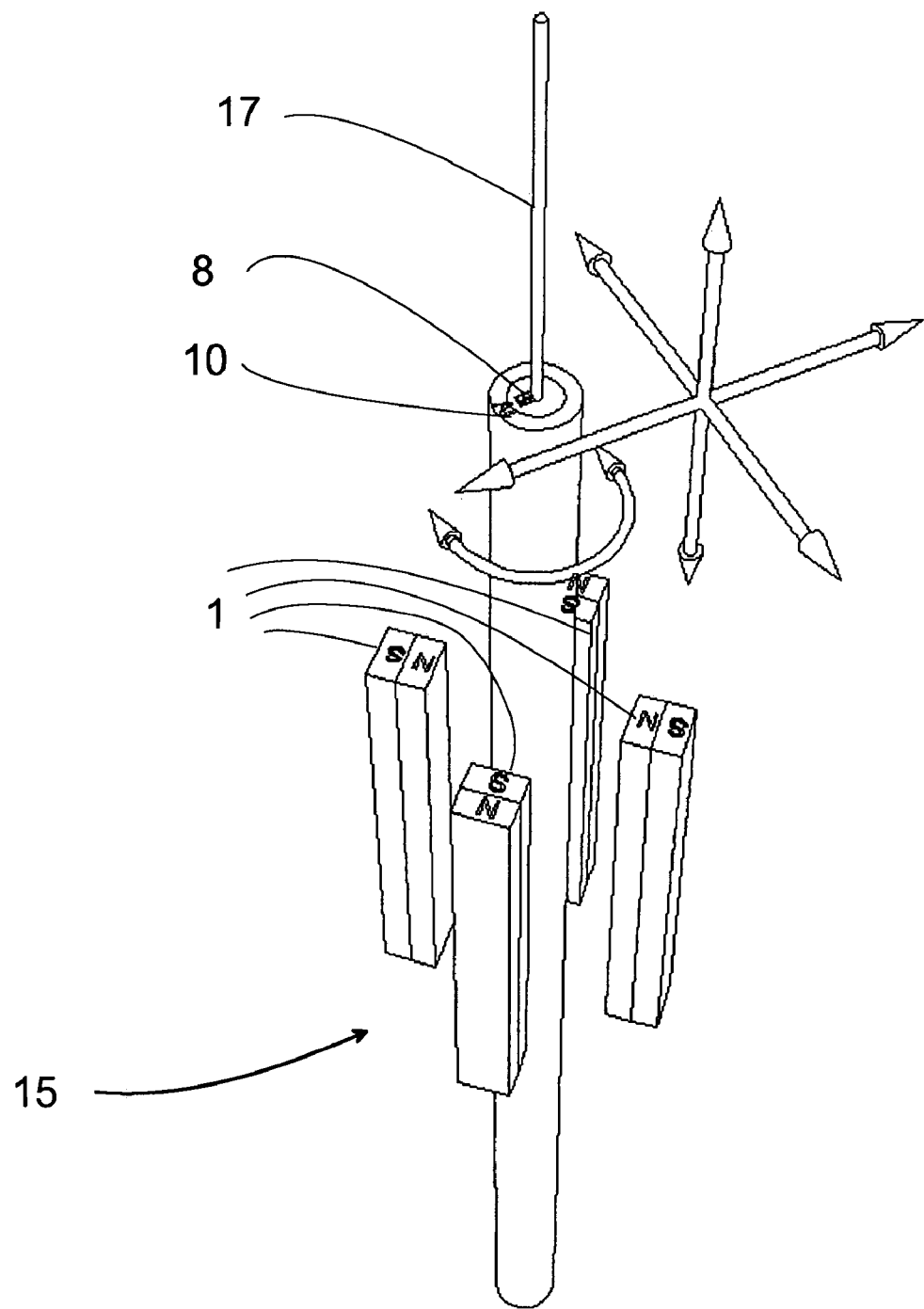
FIG. 7c shows a damping by means of eddy currents where a vertical diamagnetic rod 8 is guided in a two-dimensional quadrupole field, the rod 8 is much longer than the permanent-magnet bars, all motions indicated by arrows are damped, the diamagnetic material 8 is coated by a substance with better-conductivity 10 to enhance the damping effect.
Figure 7D:
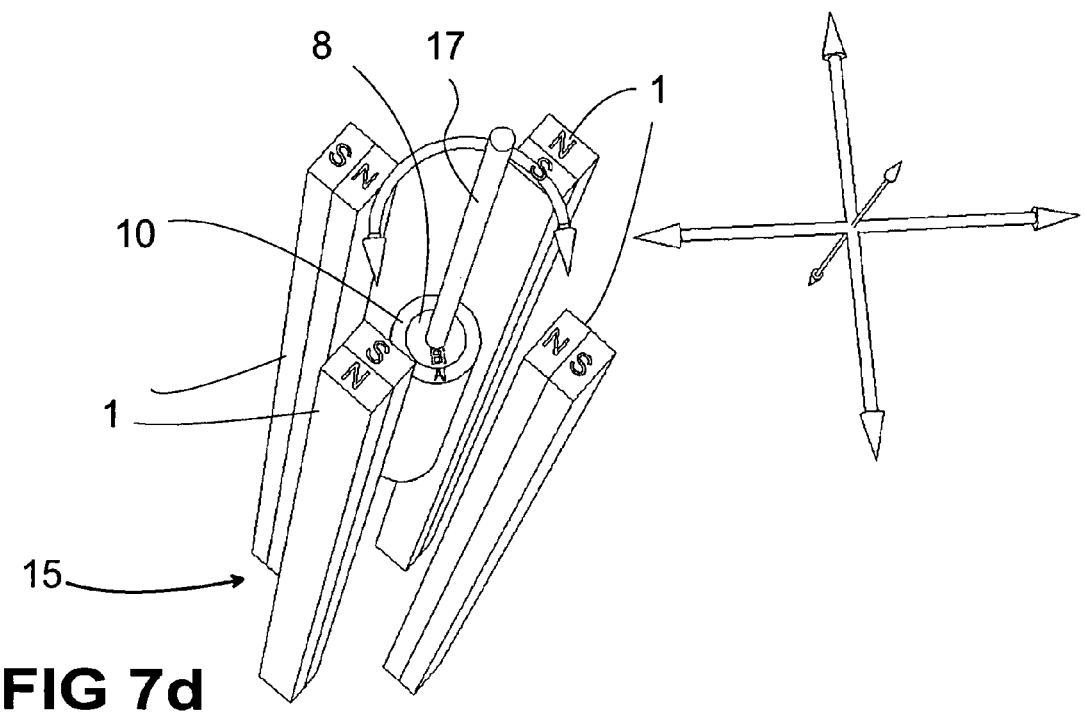
FIG. 7d shows a damping by means of eddy currents where a vertical diamagnetic rod 8 is guided in a two-dimensional quadrupole field, the rod 8 is much shorter than the permanent-magnet bars 1, three motions indicated by thick arrows are damped, the vertical motion parallel to the permanent-magnet 1 bars is not damped, indicated by a thin arrow, the diamagnetic material is coated by a substance with better conductivity 10 to enhance the damping effect.
Figure 7E:
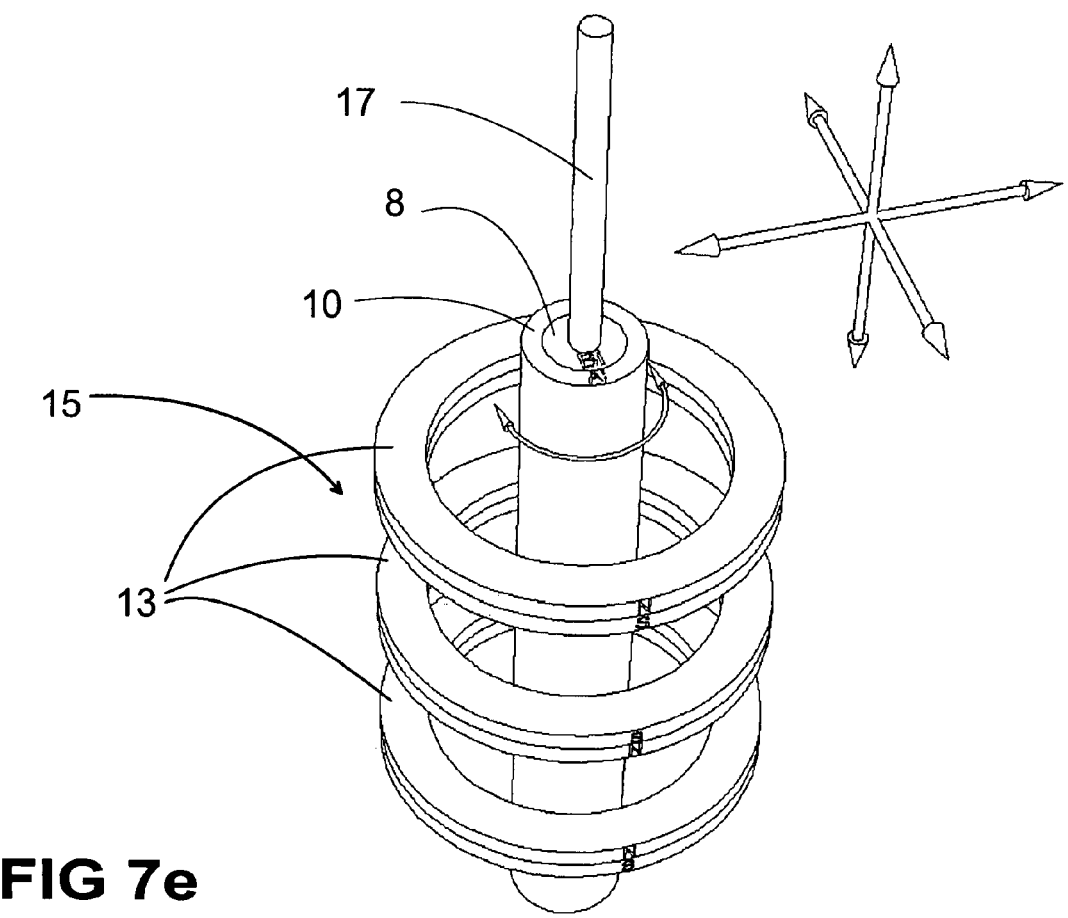
FIG. 7e shows a damping by means of eddy currents, where a vertical diamagnetic rod 8 is guided in two stacked three-dimensional quadrupole fields generated by three axially magnetized permanent-magnet rings 13, three motions indicated by thick arrows are damped, rotation around the vertical axis is not damped, indicated by a thin arrow, the diamagnetic material 8 is coated by a substance with better conductivity 10 to enhance the damping effect.

The following addresses how oscillation damping can be accomplished to suit a given application. Oscillations of a mass suspended without friction can be a problem for some applications. Oscillations can be damped effectively by means of eddy currents. It is possible to selectively damp specific degrees of freedom. In most cases it is recommended to damp all the motions restricted already by a particular stabilization system. These are all the motions characterized by a nonzero <<spring constant>> equivalent to a restoring force. Oscillation damping is not necessary for <<free motions>> in the sense of the previous paragraph because a zero spring constant corresponds to an infinite oscillation period. For some applications however damping a motion with a zero spring constant makes sense. A balance is an example opposite to a vibration transducer. The obvious way to realize eddy current damping is by using the magnetic field required for diamagnetic stabilization. Eddy currents can be generated within the diamagnetic material 8 itself if it is conductive like metallic bismuth. As shown in FIG. 7a) the diamagnetic material 8 can be coated by a substance 10 with better conductivity, e.g. aluminum, to enhance the damping effect. A few possible combinations of magnets and conducting matter are presented in FIGS. 7a through 7e. Thick arrows are indicating damped translational motions or rotations while thin arrows represent translational motions or rotations not affected by eddy current damping. In FIGS. 7a to 7e a shaft 17 is shown. This shaft 17 is coupling the diamagnetic element 8 with the levitating dipole magnet 4.

Figure 8:
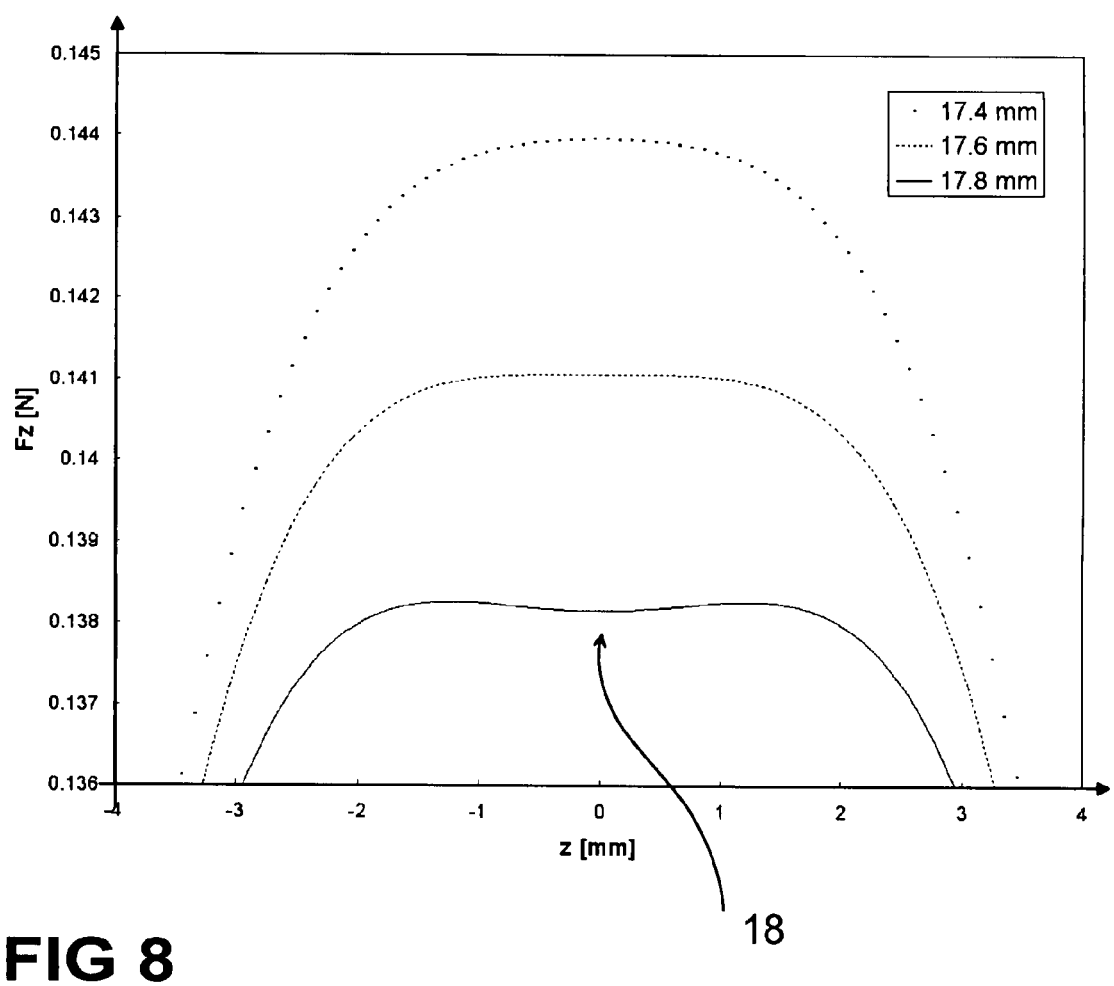
FIG. 8 shows the vertical force component $F_z$, i.e. the supporting force, is plotted as a function of the vertical position z of a supported dipole magnet 4, the three curves displayed have been calculated for three respective distances (17.4 mm, 17.6 mm, 17.8 mm) of magnet rings arranged according to FIG. 2c), in a range of z where a curve has negative slope, the vertical position is stabilized by the permanent magnets. The curve corresponding to the largest distance (solid line) is characterized by a faint local minimum 18 in the middle and by a slightly negative slope to the left of the local minimum, a levitating object with appropriate mass gets vertically stabilized when it is positioned in the range with slightly negative slope.

In order to simply suspend or guide a movable part of a mechanism, the movable part is attached to a small dipole magnet 4 supported by a quadrupole field, which is generated by permanent magnets. Depending on the degrees of freedom needed, stabilization is accomplished by one of the configurations proposed in FIGS. 5 and 6. Motions in the vertical direction normally have to be stabilized. The vertical part of stabilization is either accomplished with a diamagnetic solution, or alternatively, with the permanent magnets used for suspension. To illustrate this method in FIG. 8 the vertical force component F, i.e. the supporting force is plotted as a function of the vertical position z. The three curves displayed have been calculated for three respective distances of magnet rings 13 arranged according to FIG. 2c). In a range of z where a curve has negative slope, the vertical position is stabilized by the permanent-magnet rings 13. The curve corresponding to the largest distance is characterized by a faint local minimum 18 of the supporting force in the middle and by a slightly negative slope to the left of the local minimum 18. A levitating body with appropriate mass gets vertically stabilized when it is positioned in the range with slightly negative slope. A prototype model of such a system with a levitating body comprises two axially magnetized rings 13 according to FIG. 2c as supporting-field generator supporting and vertically stabilizing a small dipole magnet 4 in the upper part. A diamagnetic stabilization system corresponding to FIG. 6b, where a two-dimensional quadrupole field is horizontally centering a rod of diamagnetic bismuth 8, forms the lower part of such a prototype model.

Figure 3A:
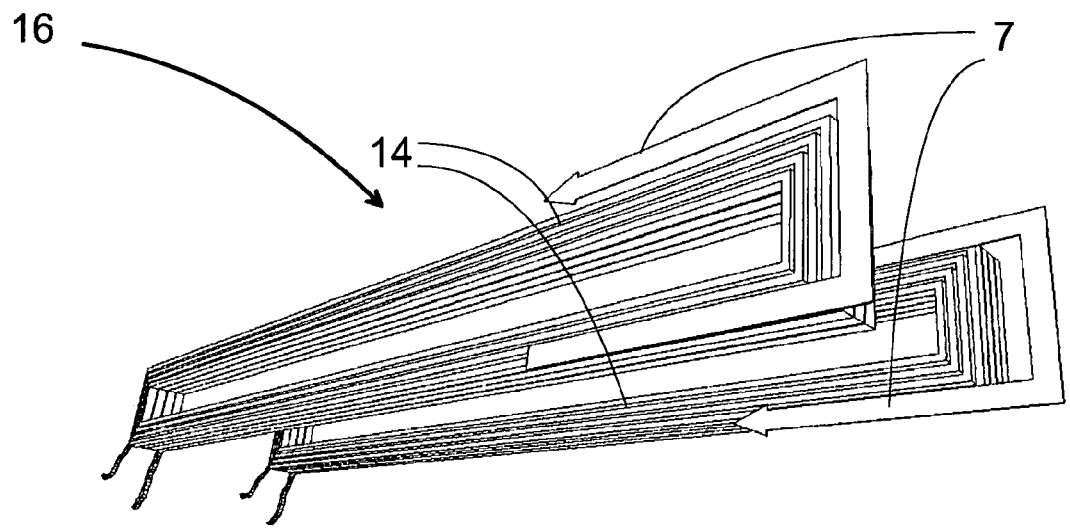
FIG. 3a shows a two-dimensional quadrupole field approximated by a pair of rectangular coils 14 analogue to anti-Helmholtz coils, arrows 7 are indicating directions of currents.
Figure 3B:
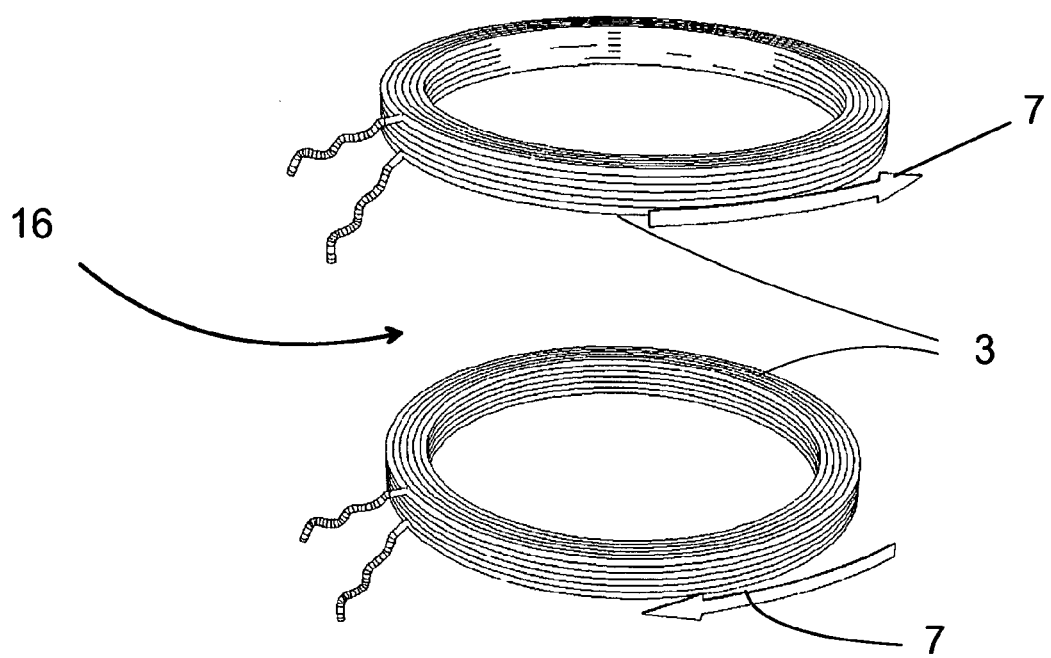
FIG. 3b shows a three-dimensional quadrupole field approximated by a pair of anti-Helmholtz coils 3, arrows 7 are indicating directions of currents.
Figure 9A:
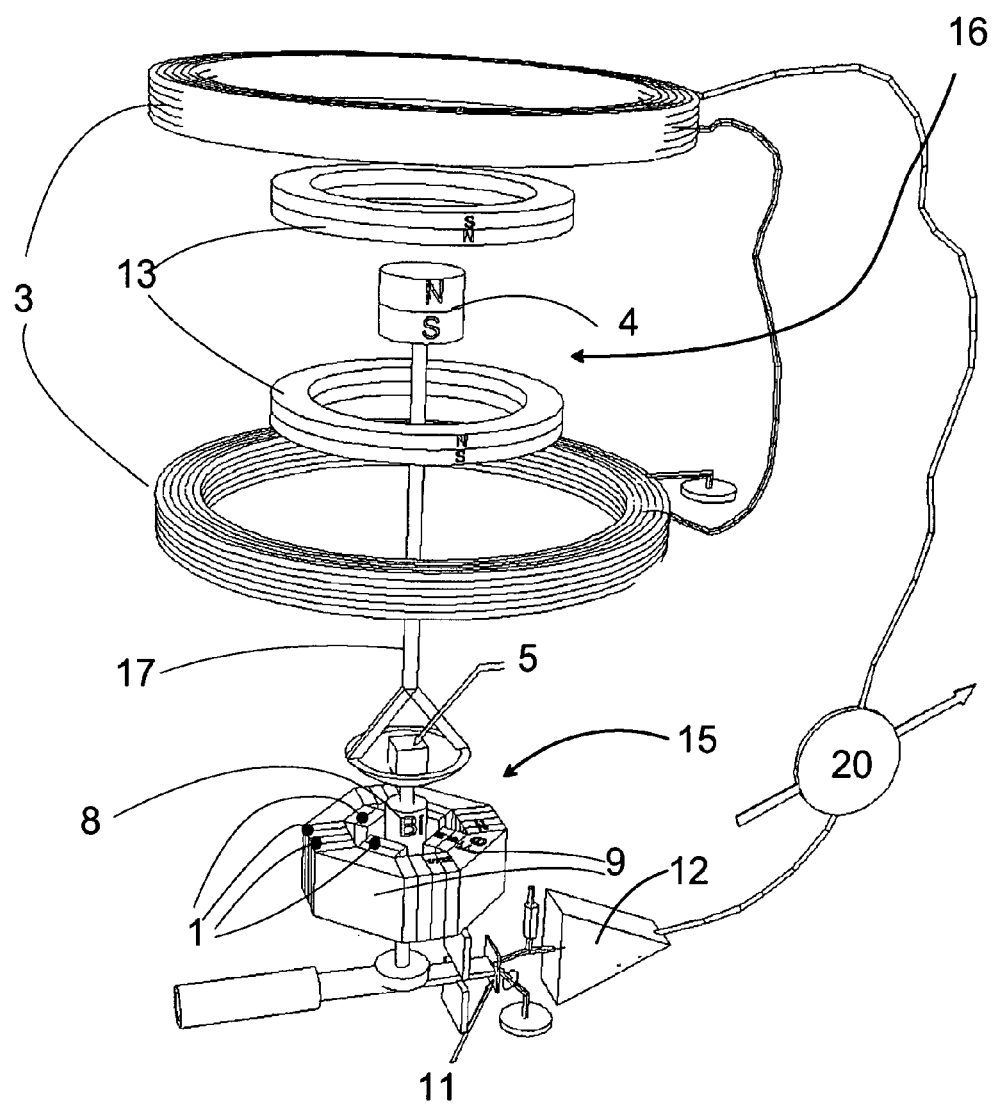
FIG. 9a shows a schematic view of a magnetic-levitation balance in a MAGLEV: A dipole magnet 4 is supported in a three-dimensional quadrupole field generated by two permanent-magnet rings 13, stabilization is achieved with a diamagnetic rod 8 immersed in a two-dimensional quadrupole field generated by permanent-magnets bars 1 connected by iron yokes 9. The weight of the sample 5 is compensated by a closed-loop servo system with a pair of anti-Helmholtz coils 3 as actuator, the current carried by the coils is measured 20 and represents the weight of the sample 5.
Figure 9B:
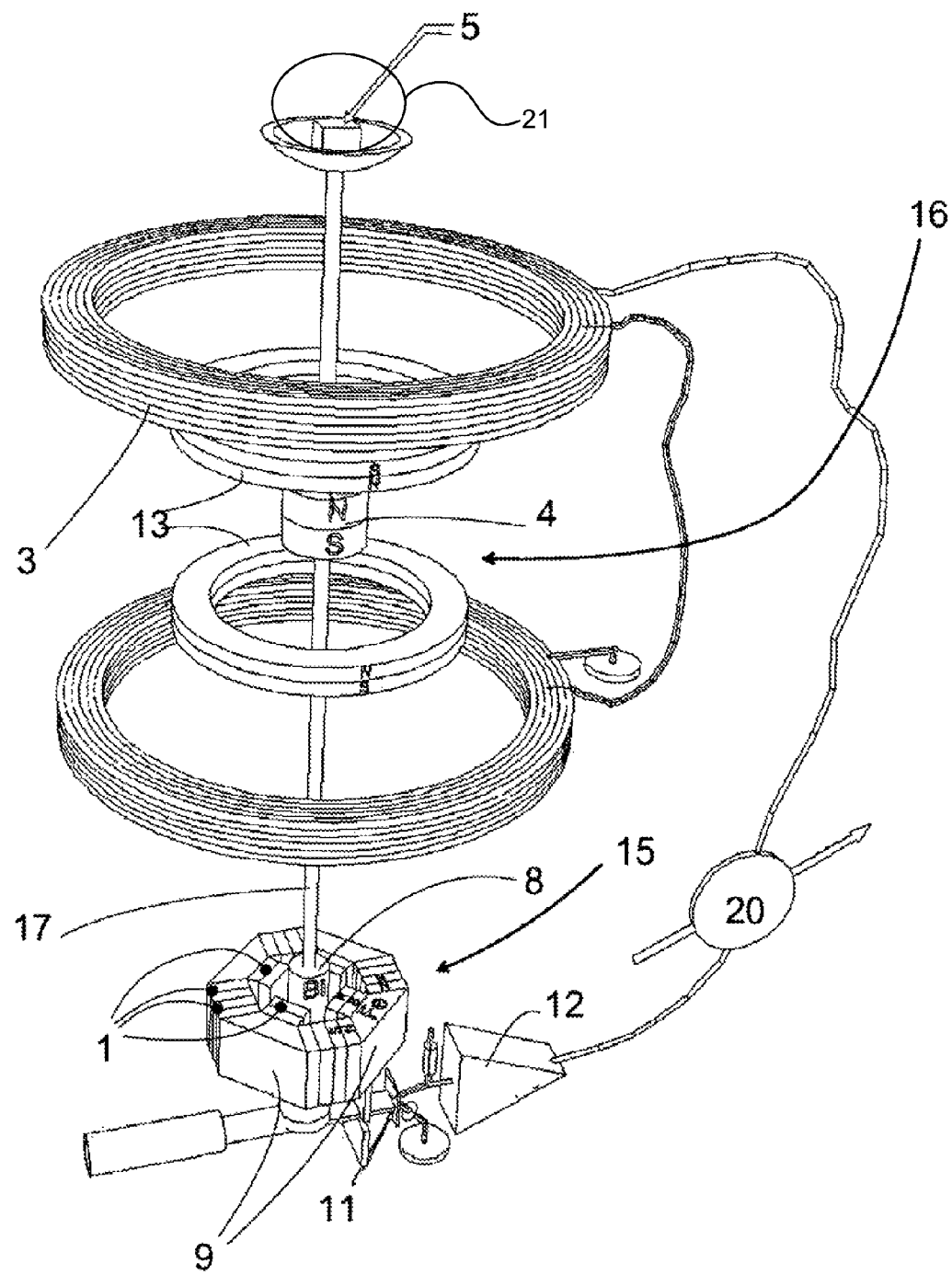
FIG. 9b shows a schematic view of a magnetic-levitation balance similar to the one depicted in FIG. 9a. In contrast to FIG. 9a the scale containing the sample 5 is here set on top of the levitating dipole 4 for easier sample handling.

To measure the force acting on a movable part of an apparatus the movable part is suspended by one of the methods described in the previous paragraph <<3 Working principle of the invention>>. The particular method is selected to allow a free motion in the direction of the force to be measured. To complete a closed-loop servo system, as described in paragraph <<2 Traditional solutions for the mentioned technical problems>> lit b), an actuator is needed. The obvious solution is to use a quadrupole field acting on a dipole magnet 4 to generate the compensating force. This quadrupole field is not generated by permanent magnets but by anti-Helmholtz coils 3 carrying an electric current. This current is, independent of the movable part's position, exactly proportional to the compensating force and hence to the force to be measured. In other words, the supporting force is a linear function of this current. If the force to be measured is vertically directed then the dipole magnet of the actuator can be identical with the dipole used to levitate the moving part. A vertically aligned dipole 4 in a quadrupole field does not experience a horizontal force. An additional horizontal dipole must therefore be attached to the movable part if a horizontal force must be compensated and measured. A schematic view of a magnetic-suspension balance utilizing the above working principle is presented in FIG. 9a. A vertical force corresponding to the sample's mass 5 is to be measured here; a single dipole magnet 4 is thus sufficient. Two permanent-magnet rings 13 according to FIG. 2c are supporting the movable part including the scale (tare). Anti-Helmholtz coils 3 according to FIG. 3b are superposing a variable quadrupole field to the static field of the permanent magnets. A closed-loop servo system is implemented to control the current of the anti-Helmholtz coils by means of a position sensor 11 and signal processing means 12 in order to compensate the weight of the sample 5. The resulting current is measured 20 to read the weight of the sample 5. In the lower part of FIG. 9a a stabilizing field generator 15 for diamagnetic stabilization according to FIG. 6b can be identified. The configuration presented in FIG. 9a can be used as accelerometer or gravimeter as well. For an easier sample 5 handling the scale of a balance can be set on top of the movable part as shown in FIG. 9b. However, a simple magnetic-suspension balance such as described here has a serious disadvantage as compared to a traditional pair of scales. The magnetic-suspension balance, as shown in FIG. 9a or 9b, is suffering from environmental influences like buoyancy of air, thermal expansion, gradient of external magnetic fields, and temperature dependence of magnetic remanence, even if no sample is on the scale. Environmental influences acting on the movable part itself can be compensated when a twin system of equal magnetic-suspension balances is used. Subtracting the anti-Helmholtz currents of the two individual balances cancels the environmental influences acting on two equal movable parts and leaves a signal corresponding to the weight of a sample put on one of the scales only.

The nonmagnetic wall of a closed vessel 21 can easily be fitted between permanent magnets and/or anti-Helmholtz coils outside and a levitating mass inside. The floating dipole magnet can be enclosed, if necessary, in a protecting glass ampoule. Equipped in this way a magnetic-suspension balance, as described in paragraph b), can be used to solve the problems exemplified in section c) of paragraph <<1. Technical problems to be solved utilizing the invention>>.

The invention and their preferred embodiments presented here have the following benefits as compared to mechanical suspension systems:

A magnetic bearing or guiding system is frictionless.

A magnetic suspension is much more robust than a comparable low-friction mechanical suspension. Field lines can not become irreversibly bent or screwed up like a delicate spring nor can they break or get blunt like a pin bearing or the knife edge of a traditional pair of scales.

The invention and their preferred embodiments have four merits over conventional active magnetic-bearing systems:

i) Active magnetic-bearing systems, making use of electromagnets, need complicated electronics and power for their operation. A passive magnetic-suspension system however, using only permanent magnets and diamagnetic material, is working without electronics and power consumption.

ii) Since active magnetic-levitation systems use electromagnets with iron cores as their actuators, the magnet current needed to achieve a given force is strongly dependent on the position of the levitated mass. In order to use such a system as a balance the position must be stabilized with extreme precision. By contrast a small dipole magnet in a perfect quadrupole field is lifted with a constant force independent of its position.

iii) The absolute value of the magnetic field between the pole pieces of an electromagnet is an ambiguous function of the current in its coil. Magnetic hysteresis effects occurring even in the best available soft-magnetic materials are the cause of this phenomenon. The current needed to actually meet a given force is therefore dependent on the history of the magnet current. An electromagnet with an iron core is therefore not appropriate as an actuator in a precision closed-loop servo system like a magnetic-levitation balance for instance. The invention presented here uses coils without an iron core as the solution to the above problem. Coils without an iron core however cannot carry as much weight as electromagnets with an iron core. But with this invention the main load can be carried by permanent magnets while coils are used for minor corrections only. Modern permanent magnets made of materials containing rare-earth elements have a magnetic permeability value near 1. These magnets can be placed close to coils without acting as unwanted <<iron cores>>.

iv) U.S. Pat. No. 5,485,748 addresses two of the above mentioned technical problems, namely measuring a force experienced by a mass, and housing a levitating body in a closed vessel, that can be solved in a superior way by the invention presented here. The main drawbacks of U.S. Pat. No. 5,485,748 are:

Radial stabilization of the levitating body is achieved with classical passive permanent magnetic radial bearings. According to Earnshaw's theorem these bearings are associated with a strong axial instability. A slight axial offset results in a strong axial force tending to eject the centered dipole magnet axially. This effect is equivalent to a spring, adding a position dependent force to the force/weight to be measured. In order to cope with that additional force and to achieve axially stable levitation the axial position needs to be stabilized with extreme precision by means of an active feedback circuit.

The axial force compensating the force/weight to be measured is exerted by a solenoid acting on two dipole magnets with facing equal poles disposed in the levitating body. The axial force provided by this arrangement is a function of the axial position and therefore again requires very precise axial stabilization by active circuitry.

Passive magnetic levitation with superconductors has two disadvantages as compared to stabilization with weakly diamagnetic materials:

Superconductors need cryogenic temperatures. A costly cooling system is required and substantial energy consumption is the result.

Superconductors completely expel magnetic fields. Unlike weakly diamagnetic materials they cannot be placed close to permanent magnets or coils without heavily perturbing their magnetic fields. A superconducting tube for example prevents variations of the magnetic field in the space it is enclosing. Changing the current of a nearby coil has no effect on the field inside.

The invention and their preferred embodiments have the following advantages over earlier passive magnetic levitation systems with weakly diamagnetic materials:

a) Magnetic-levitation systems based solely on repulsion of weakly diamagnetic material typically need very strong magnets. A main class of very strong magnets makes use of superconductors. This results in energy consumption and system complexity as mentioned above. See Simon et al., above.

b) A diamagnetic body levitated repulsively by an array of permanent dipole magnets, as described in PCT application WO 2004/020942 A1, does experience a position dependent force unlike a dipole magnet supported in a quadrupole field as presented here. A force measurement system according to WO 2004/020942 A1 therefore needs a closed-loop servo system holding the body's position at much higher precision as compared to the present invention.

c) A magnetic-levitation system achieving the force to carry the main load by means of a big stationary dipole magnet attracting a small levitating dipole magnet reaches a limited load capacity only. Typically this capacity is just sufficient to carry the levitating dipole magnet, see Simon et al., above. The prototype model depicted in FIG. 9 is supporting a <<payload>>5 of 14 g attached to a 0.4 g levitating dipole magnet. A big dipole magnet, in contrast to a quadrupole field, is exerting a position dependent force on the small dipole magnet. This effect is comparable to a spring action. When a dipole field—instead of a quadrupole—is used as supporting field to design a balance, then the closed-loop servo system is much more demanding in terms of positional stability. A big dipole magnet as supporting-field generator allows a free rotation around the vertical axis only. A big dipole magnet can be extended to a two-dimensional dipole. This makes the design of a linear transportation system possible, as disclosed in U.S. Pat.

No. 6,483,222. In contrast, the quadrupole field, used in the present invention as supporting field, allows of up to three degrees of freedom.

d) A quadrupole field cannot only be generated by means of permanent magnets and/or anti-Helmholtz coils, as described above. Electromagnets or permanent magnets with hyperbolic pole pieces are an alternative. But in a quadrupole field generated with ferromagnetic pole pieces the force supporting a dipole magnet is not constant but dependent on the dipole's position. The dipole is attracted by the ferromagnetic pole pieces the closer the stronger even if neither coils nor permanent magnets are intentionally magnetizing the pole pieces. This effect is responsible for a severe instability (see Braunbek, above), which cannot be compensated by means of weakly diamagnetic material. Therefore a magnetic levitation system with hyperbolic pole pieces, as described in U.S. Pat. No. 3,493,275, is nothing else but an ordinary active magnetic-levitation system with electromagnets. Based on our own experiments carried out in preparation of this patent application we believe that the configuration presented in FIG. 1 of U.S. Pat. No. 3,493,275 is not—as intended—stabilized by means of diamagnetic material.

Horizontal stabilization is rather achieved by mutual attraction of dipole poles and pole pieces above and below the levitating dipole magnet. As a consequence of this horizontal centering action a vertical instability is expected. This instability must be compensated by means of the closed-loop servo system included in the configuration. U.S. Pat. No. 3,493,275 is suffering from the disadvantages of all ordinary active magnetic-levitation systems, hysteresis for example.

A balance based on the invention and their preferred embodiments have three benefits as compared to commercially available micro balances:

i) The new balance can be manufactured at low costs and is very robust.

ii) The magnetic-levitation balance described in paragraph 4 c) does not need an additional conventional balance like the commercial version explained in paragraph 2c).

iii) Based on preliminary experiments a resolution of 1 ng is expected for the new kind of magnetic-levitation balance as compared to the best commercially available ultra-micro balances with a resolution of 0.1 µg. If expectations can be met the term <<nano balance>> will be justified.

The invention claimed is:

1. A magnetic levitation system for supporting an object against gravity by a supporting force, comprising:
   a permanent-magnet dipole aligned in a vertical position and coupled to the object;
   a supporting-field generator configured to generate a supporting force on the dipole via a supporting field, wherein the supporting field is a two-dimensional or three-dimensional magnetic quadrupole field so that the supporting force is independent of a position of the dipole; and
   a stabilization system configured to constrain the dipole against movements in at least one horizontal direction, wherein the stabilization system comprises:
   a diamagnetic element coupled to the dipole and arranged below the dipole;
   a stabilizing-field generator generating a second two-dimensional or three-dimensional stabilizing field to restore the diamagnetic element to a position where the field strength of the stabilizing field has a local minimum.

2. The magnetic levitation system of claim 1, wherein the stabilizing-field generator generates a two-dimensional or three-dimensional magnetic quadrupole field.

3. The magnetic levitation system of claim 1, wherein the supporting-field generator is an arrangement of permanent magnets.

4. The magnetic levitation system of claim 1, wherein the supporting-field generator comprises a pair of anti-Helmholtz coils.

5. The magnetic levitation system of claim 1, wherein the supporting-field generator is a pair of anti-Helmholtz coils.

6. The magnetic levitation system of claim 4, further comprising: a non-contact position sensor delivering a signal equivalent to the vertical position of said object; signal processing means transforming said signal into a current, driven through the anti-Helmholtz coils so as to restore said object to a stationary vertical position.

7. The magnetic levitation system of claim 6, further comprising means for measuring said current which represents the supporting force being a linear function of said current.

8. The magnetic levitation system of claim 3, wherein the supporting-field generator has a characteristic in which the supporting force has a local minimum as a function of the dipole's vertical position thereby providing vertical stabilization below said local minimum.

9. The magnetic levitation system of claim 1, furthermore comprising a non magnetic vessel completely enclosing said object while at least one of the supporting-field generator and the stabilizing-field generator is outside of the vessel.

10. A magnetic levitation system for supporting an object against gravity by a supporting force, comprising:
    a permanent-magnet dipole aligned in a vertical position and coupled to the object;
    a supporting-field generator including coils and configured to generate a supporting force on the dipole via a supporting field, the supporting field being a two-dimensional or three-dimensional magnetic quadrupole field so that the supporting force is independent of a position of the dipole, the coils of said supporting-field generator not having an iron core; and
    a stabilization system configured to constrain the dipole against movements in at least one horizontal direction, the stabilization system including:
    a diamagnetic element coupled to the dipole and arranged below the dipole;
    a stabilizing-field generator generating a second two-dimensional or three-dimensional stabilizing field to restore the diamagnetic element to a position where the field strength of the stabilizing field has a local minimum.

\* \* \* \* \*